United States Patent
Okada et al.

(10) Patent No.: US 8,294,513 B2
(45) Date of Patent: Oct. 23, 2012

(54) DEMODULATOR AND DEMODULATION METHOD

(75) Inventors: Mitsuji Okada, Kanagawa (JP); Hiromi Saitou, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 93 days.

(21) Appl. No.: 12/892,511

(22) Filed: Sep. 28, 2010

(65) Prior Publication Data

US 2011/0074501 A1 Mar. 31, 2011

(30) Foreign Application Priority Data

Sep. 29, 2009 (JP) ................................. 2009-223964

(51) Int. Cl.
*H03D 1/00* (2006.01)
(52) U.S. Cl. ........................................ 329/347; 329/304
(58) Field of Classification Search ................... 329/347, 329/304; 332/103
See application file for complete search history.

(56) References Cited

U.S. PATENT DOCUMENTS

| | | | | |
|---|---|---|---|---|
| 4,546,323 A | * | 10/1985 | Ryu | 329/309 |
| 6,975,693 B1 | * | 12/2005 | Hillery et al. | 375/350 |
| 2003/0206073 A1 | * | 11/2003 | Kravtsov | 332/103 |

FOREIGN PATENT DOCUMENTS

JP 2008-085396 A 4/2008

* cited by examiner

*Primary Examiner* — Joseph Chang
(74) *Attorney, Agent, or Firm* — Sughrue Mion, PLLC (57) ABSTRACT

A demodulator according to the present invention is the demodulator that demodulates a plurality of received symbols having different amplitude of carrier wave. The demodulator includes an amplitude value calculation unit that calculates a received symbol amplitude value by adding an absolute value of in-phase component and an absolute value of quadrature component determined from the amplitude of the carrier wave in the received symbol. Further, the demodulator includes a demodulation unit that detects a change of the received symbol amplitude value calculated by the amplitude value calculation unit, and demodulates the received symbol based on the detection result.

11 Claims, 6 Drawing Sheets

| t | α(t) | β(t) | β(t)/α(t) | α²(t) + β²(t) |
|---|------|------|-----------|---------------|
| 1 | 7/8  | 3/4  | 0.85714   | 1.32815       |
| 2 | 9/8  | 1/4  | 0.22222   | 1.32815       |

DEMODULATOR AND DEMODULATION METHOD

INCORPORATION BY REFERENCE

This application is based upon and claims the benefit of priority from Japanese patent application No. 2009-223964, filed on Sep. 29, 2009, the disclosure of which is incorporated herein in its entirety by reference.

BACKGROUND

1. Field of the Invention

The present invention relates to a demodulator and a demodulation method, and particularly to a demodulator and a demodulation method using a received symbol having the different amplitude values.

2. Description of Related Art

Recently, a communication IC (Integrated Circuit) which includes both of an analog circuit and a digital circuit has been developed. The communication IC transfers the signal processing performed for the analog signal to the signal processing performed for the digital signal output from ADC (Analog to Digital Converter). The transferring to the digital signal processing has a merit that a chip area and the cost can be reduced by using a deep-submicron process. Further, the transferring to the digital signal processing has a merit that the communication IC including further functions is developed without changing a chip area. However, by setting finely sampling range and making the number of the quantization bits large, the reduction of a quantization noise needs to be reduced so that the digital signal processing performs signal processing equal to the analog signal processing. In general, an ASK (Amplitude Shift Keying) demodulator uses a circuit that calculates the amplitude by a square operation circuit and a square root operation circuit. However, the circuit that calculates the amplitude using the square operation circuit and the square root operation circuit increases a circuit scale and leads to increase in the chip area when the operation circuit having a large bit width is composed of the digital circuit. Therefore an ASK demodulator of a small circuit scale has been increasingly demanded. The ASK demodulator of a small circuit does not use the square operation circuit and the square root operation circuit.

Figure 4:
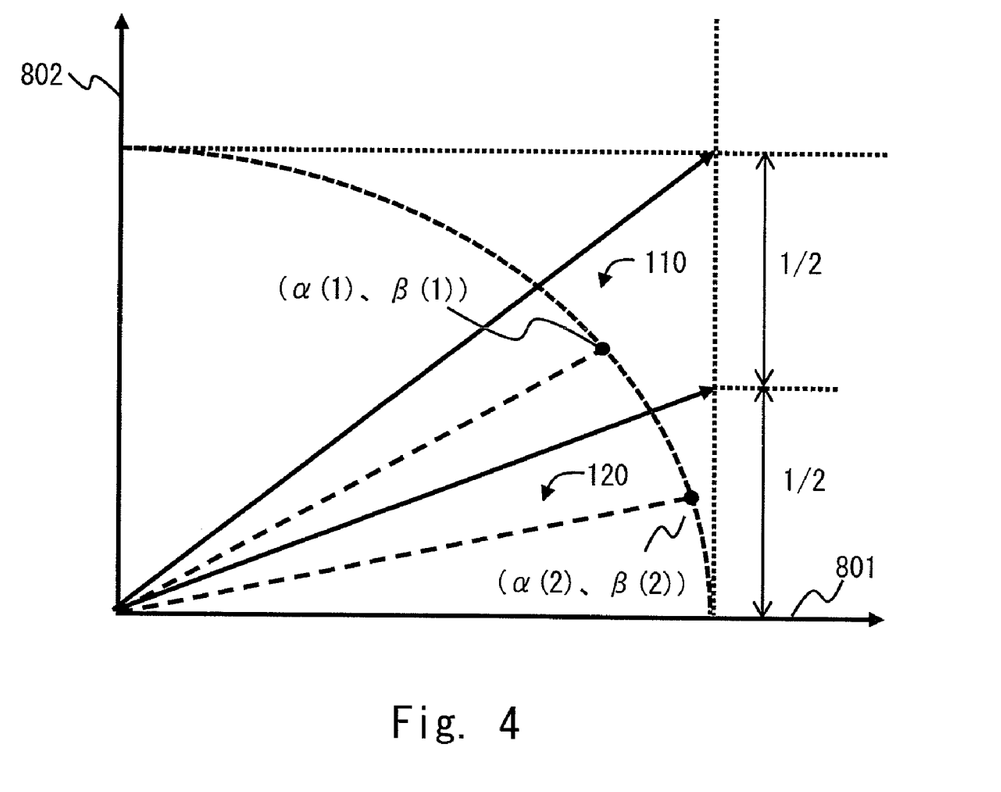
FIG. 4 illustrates an angle area of a received symbol in accordance with Japanese Unexamined Patent Application Publication No. 2008-85396.

Japanese Unexamined Patent Application Publication No. 2008-85396 discloses a demodulator that can demodulate a received signal without using the square operation circuit and the square root operation circuit. FIG. 4 shows an angle area of received symbol in demodulation processing disclosed in Japanese Unexamined Patent Application Publication No. 2008-85396 and the example of the estimated symbol difference area divided into two parts in the estimated symbol difference plane. FIG. 4 shows a graph in which a horizontal axis is an X axis 801 of the estimated symbol difference plane and a vertical axis is a Y axis 802 of the estimated symbol difference plane.

The symbol tan θ shown with angle θ of a position vector (X,Y) on the estimated symbol difference plane is Y/X. Thus, for example, it is determined which of two angle areas the vector (X,Y) belongs to by determining whether X and Y satisfy the conditional expression of Y/X<½. When the result of determination satisfies the conditional expression, it can be considered that the position vector (X,Y) belongs to an angle area 120. When the result of determination does not satisfy the conditional expression, it can be considered that the position vector (X,Y) belongs to an angle area 110.

The approximation function F(t) to calculate an absolute value of each element in the estimated symbol difference vector is determined by following expressions (1) and (2) for each angle area 110 and 120 defined in FIG. 4. The symbol "r" shows a positive constant.

$$F(t)=\alpha(t)X+\beta(t)Y \quad (1)$$

$$\alpha(t)^2+\beta(t)^2 \approx r^2 \quad (2)$$

Figure 5:
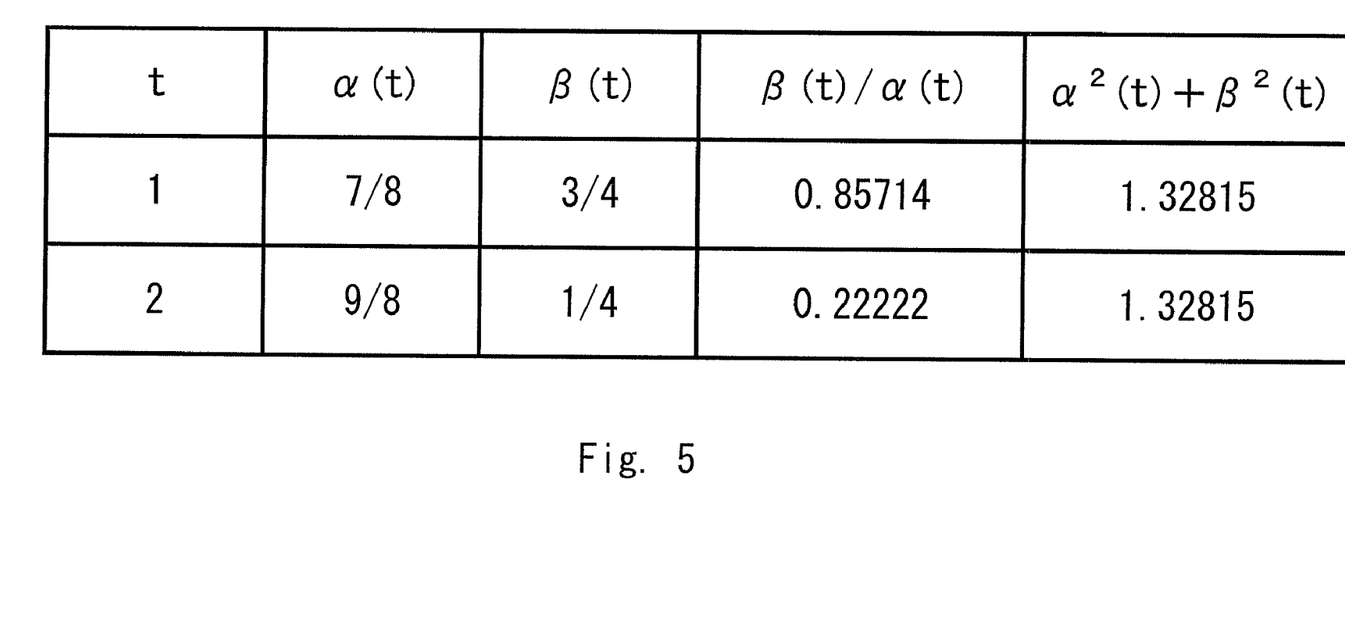
FIG. 5 illustrates an approximation value to calculate an amplitude value of carrier wave in a received symbol in accordance with Japanese Unexamined Patent Application Publication No. 2008-85396.

When the symbol "t" is the identifier number of the angle area obtained by dividing the estimated symbol difference area (in this case, the symbol "t" is 1 or 2), in order to determine the constants $\alpha(t)$ and $\beta(t)$ which are used for the approximation function F(t) shown in the expression (1), the constants $\alpha(t)$ and $\beta(t)$ are selected so that arctan ($\beta(t)/\alpha(t)$) is included in the angle range of the angle area t, and $\alpha(t)$ and $\beta(t)$ satisfy the expression (2). For example, when $\alpha(t)$ and $\beta(t)$ are selected so that arctan ($\beta(t)/\alpha(t)$) is close to the central angle of the angle area t and the value of $\alpha(t)^2+\beta(t)^2$ is close to "1.32", $\alpha(t)$ and $\beta(t)$ are the values shown in FIG. 5. FIG. 5 shows an example of the approximation constant used for the example of angle area division in Related Art. Further, the values of $\alpha(t)$ and $\beta(t)$ can be expressed by addition or subtraction of ½$^n$. Therefore, the circuit to calculate the approximation formula F(t)=$\alpha$(t)X+$\beta$(t)Y is composed of the simple circuit as combination of a bit shift circuit and an adder circuit.

Figure 6:
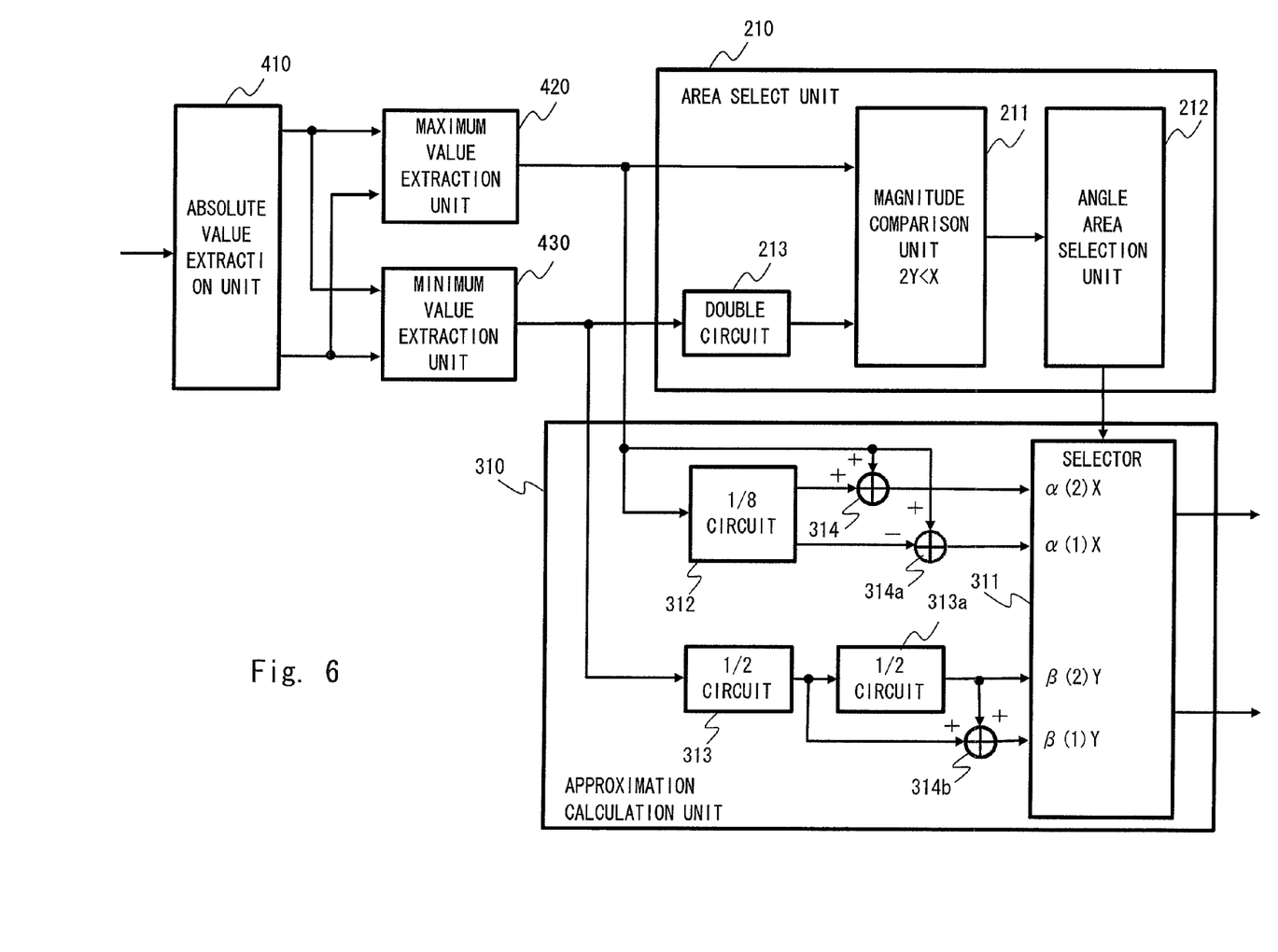
FIG. 6 is a configuration diagram of a demodulator in accordance with Japanese Unexamined Patent Application Publication No. 2008-85396.

FIG. 6 shows the example of a circuit configuration corresponding to the angle area division. When an absolute value extraction unit 410 receives the complex number z=x+yi as each element of the estimated symbol difference vector, the absolute value extraction unit 410 extracts the absolute value |Re(z)|=|x| of real part in the complex number z and the absolute value |Im(z)|=|y| of imaginary part in the complex number z. The absolute value extraction unit 410 outputs |x| and |y| to a maximum value extraction unit 420 and a minimum value extraction unit 430. The maximum value extraction unit 420 extracts the maximum value of the absolute value |Re(z)|=|x| of real part and the absolute value |Im(z)|=|y| of imaginary part extracted by the absolute value extraction unit 410 and outputs the maximum value as X to an area select unit 210 and an approximation calculation unit 310. The minimum value extraction unit 430 extracts the minimum value of the absolute value |Re(z)|=|x| of real part and the absolute value |Im(z)|=|y| of imaginary part extracted by the absolute value extraction unit 410 and outputs the minimum value as Y to the area select unit 210 and the approximation calculation unit 310.

In the area select unit 210, a magnitude comparison unit 211 receives X output from the maximum value extraction unit 420. Y output from the minimum value extraction unit 430 is doubled in a double circuit 213 by bit shift processing. The magnitude comparison unit 211 receives it as 2Y. The magnitude comparison unit 211 compares X output from the maximum value extraction unit 420 and 2Y output from the double circuit 213. The magnitude comparison unit 211 notifies the comparison result to an angle area select unit 212. Based on the comparison result notified from the magnitude comparison unit 211, the angle area select unit 212 selects the angle area t where the position vector (X,Y) on the estimated symbol difference plane locates. The angle range of the angle area 110 in t=1 is arctan (½)≦θ≦π/4. The angle range of the angle area 120 in t=2 is 0≦θ<arctan (½). Accordingly, when X and Y satisfy the conditional expression as Y/X<½ or 2Y<X, the angle area select unit 212 selects the angle area 120. When X and Y do not satisfy the conditional expression as Y/X<½ or 2Y<X, the angle area select unit 212 selects the angle area 110. The angle area select unit 212 notifies the number t of the selected angle area to a selector 311 in the approximation calculation unit 310.

The approximation calculation unit 310 includes the selector 311 to select the approximation function F(t) and the circuit multiplying the coordinates X and Y of the position vector (X,Y) on the estimated symbol difference plane by the approximation constants α(t) and β(t) and adding. The selector 311 selects the approximation function F(t) of the angle area based on the angle area number t notified from the angle area select unit 212. FIG. 5 shows α(1)=⅞ and α(2)=9/8. A ⅛ circuit 312, an adder circuit 314 and an adder circuit 314a are provided to multiply α(t) by X. The ⅛ circuit 312 is the circuit multiplying the input data by ⅛ using the bit shift. The adder circuits 314 and 314a perform adding or subtracting according to the code as '+' or '−'.

For example, α(1) is expressed as add-subtract of squaring like α(1)=⅞=1−⅛. Therefore, α(1) is calculated by the circuit composition shown in the approximation calculation unit 310 of FIG. 6. The other approximation constants are also expressed as add-subtract of squaring. Further, FIG. 5 shows β(1)=¾, β(2)=¼. A ½ circuit 313, a ½ circuit 313a and an adder circuit 314b are provided to multiply β(t) by Y. The ½ circuits 313 and 313a multiply the input data by ½ using the bit shift. The adder circuit 314b perform adding or subtracting according to the code as '+' or '−'. The symbol β(t) is also expressed as add-subtract of squaring, so that β(t) is calculated by the circuit composition shown in the approximation calculation unit 310 of FIG. 6.

The calculation results of α(t)X and β(t)Y obtained by performing approximation calculation are output to the selector 311. The selector 311 selects the value of α(t)X and β(t)Y corresponding to the angle area number t notified from the angle area select unit 212 of α(t)X output from the adders 314 and 314a and β(t)Y output from the ½ circuit 313a and the adder 314b, and outputs the selected value. According to the result, the demodulation circuit can select the approximation constant α or β in each area, and approximate the absolute value |Z| of the estimated symbol difference z=x+yi using αX+βY.

SUMMARY

The demodulator disclosed by Japanese Unexamined Patent Application Publication No. 2008-85396 has the problem that when demodulation precision is increased, the circuit scale and the calculation amount increase. In the demodulator disclosed by Japanese Unexamined Patent Application Publication No. 2008-85396, A is amplitude, (X,Y) is coordinate, X=cos θ, Y=sin θ. In this case, amplitude A is calculated by the expression (3).

$$A = \frac{A^2}{A} = \frac{1}{A}(X^2 + Y^2) = X\frac{X}{A} + Y\frac{Y}{A} = X\cos\theta + Y\sin\theta \tag{3}$$

Further, the following expression (4) is the expression that shows the above expression (3) approximately.

$$A \approx X\alpha + Y\beta \tag{4}$$

When the coordinate (X,Y) is the value in the area of the angle area 110 in FIG. 4, α and β are the values corresponding to t=1 in FIG. 5. When the coordinate (X,Y) is the value in the area of the angle area 120 in FIG. 4, α and β are the values corresponding to t=2 in FIG. 5. According to FIG. 4, when the coordinate is in the angle area 110, α and β approximate to the value that is in t=1 in FIG. 5. When the coordinate is in the angle area 120, α and β approximate to the value that is in t=2 in FIG. 5. Accordingly, when the coordinate (X,Y) is in the angle area 110, the angle approximates to arctan (0.85714). When the coordinate (X,Y) is in the angle area 120, the angle approximates to arctan (0.22222).

Next, the error between the amplitude calculated by the angle approximated in each angle area and the amplitude calculated by the actual angle of the coordinate (X,Y) is calculated by the expression (3). The actual angle of the coordinate (X,Y) is θ. The angle determined in the angle area is θ+Δθ. The symbol Δθ is the difference between the actual angle of the coordinate (X,Y) and the angle determined in the angle area. The symbol ΔA is the difference between the amplitude calculated by the actual angle of the coordinate (X,Y) and the amplitude calculated by the angle determined in the angle area. The amplitude difference of ASK demodulation is shown by the expression (5). The amplitude difference of ASK demodulation is demodulation precision.

$$\Delta A = X\cos\theta + Y\sin\theta - \{X\sin(\theta + \Delta\theta) + Y\cos(\theta + \Delta\theta)\} \tag{5}$$

$$= X\left\{2\cos\left(\frac{2\theta + \Delta\theta}{2}\right)\sin\left(\frac{\Delta\theta}{2}\right)\right\} - Y\left\{2\sin\left(\frac{2\theta + \Delta\theta}{2}\right)\sin\left(\frac{\Delta\theta}{2}\right)\right\}$$

With reference to the expression (5), it is necessary to make Δθ small in order to make the amplitude error ΔA small. The symbol Δθ is the difference between the actual angle of the coordinate (X,Y) and the angle determined in the angle area, so that the angle determined in the angle area can approach the actual angle of the coordinate (X,Y) by fragmentation of the angle area. However, the fragmentation of the angle area needs a plurality of circuits determining the angle area according to the number of angle areas that are fragmented in the area select unit 210 of FIG. 6. The approximation calculation unit 310 also needs a plurality of operation circuits calculating the approximation value of both α and β according to the number of angle areas that are fragmented. Therefore, the circuit scale and the calculation amount increase.

A first exemplary aspect of the present invention is a demodulator that demodulates a plurality of received symbols having different amplitude of carrier wave, the demodulator including: an amplitude value calculation unit that calculates a received symbol amplitude value by adding an absolute value of in-phase component and an absolute value of quadrature component determined from the amplitude of the carrier wave in the received symbol; and a demodulation unit that detects a change of the received symbol amplitude value calculated by the amplitude value calculation unit, and demodulates the received symbol based on the detection result.

According to the above-described demodulator, the demodulation of received symbol can be performed by the received symbol amplitude value obtained by adding the absolute value of in-phase component and the absolute value of quadrature component determined from the amplitude value of carrier wave in the received symbol, so that the calculation amount calculated in the demodulator is reduced.

A second exemplary aspect of the present invention is a demodulation method including: acquiring a plurality of received symbols having different amplitude of carrier wave; calculating a received symbol amplitude value by adding an absolute value of in-phase component and an absolute value of quadrature component determined from the amplitude of the carrier wave in the received symbol; setting different thresholds according to a value of a demodulation signal that is output; detecting a change of the received symbol amplitude value using the different threshold; and demodulating the received symbol based on the detecting result.

According to the above-described demodulation method, the demodulation of received symbol can be performed by the received symbol amplitude value obtained by adding the absolute value of in-phase component and the absolute value of quadrature component determined from the amplitude of carrier wave in the received symbol, so that the complexity performed in the demodulator is reduced.

The present invention can provide, according to exemplary aspects, a demodulator and a demodulation method capable of reducing the complexity.

BRIEF DESCRIPTION OF THE DRAWINGS

The above and other exemplary aspects, advantages and features will be more apparent from the following description of certain exemplary embodiments taken in conjunction with the accompanying drawings, in which.

DETAILED DESCRIPTION OF THE EXEMPLARY EMBODIMENTS

The first and second exemplary embodiments can be combined as desirable by one of ordinary skill in the art.

[First Exemplary Embodiment]

Exemplary embodiments of the present invention are explained hereinafter with reference to the drawings. An example of the configuration of a demodulator in accordance with a first exemplary aspect of the present invention is explained with reference to FIG. 1. The demodulator is provided with an amplitude calculation unit 10, a demodulation unit 20, a maximum value determination circuit 30 and a maximum value storage circuit 40. Further, the amplitude calculation unit 10 has an absolute value extraction unit 12 and an adding unit 14. The demodulation unit 20 has a hysteresis threshold determination circuit 22 and a demodulation circuit 24.

Figure 1:
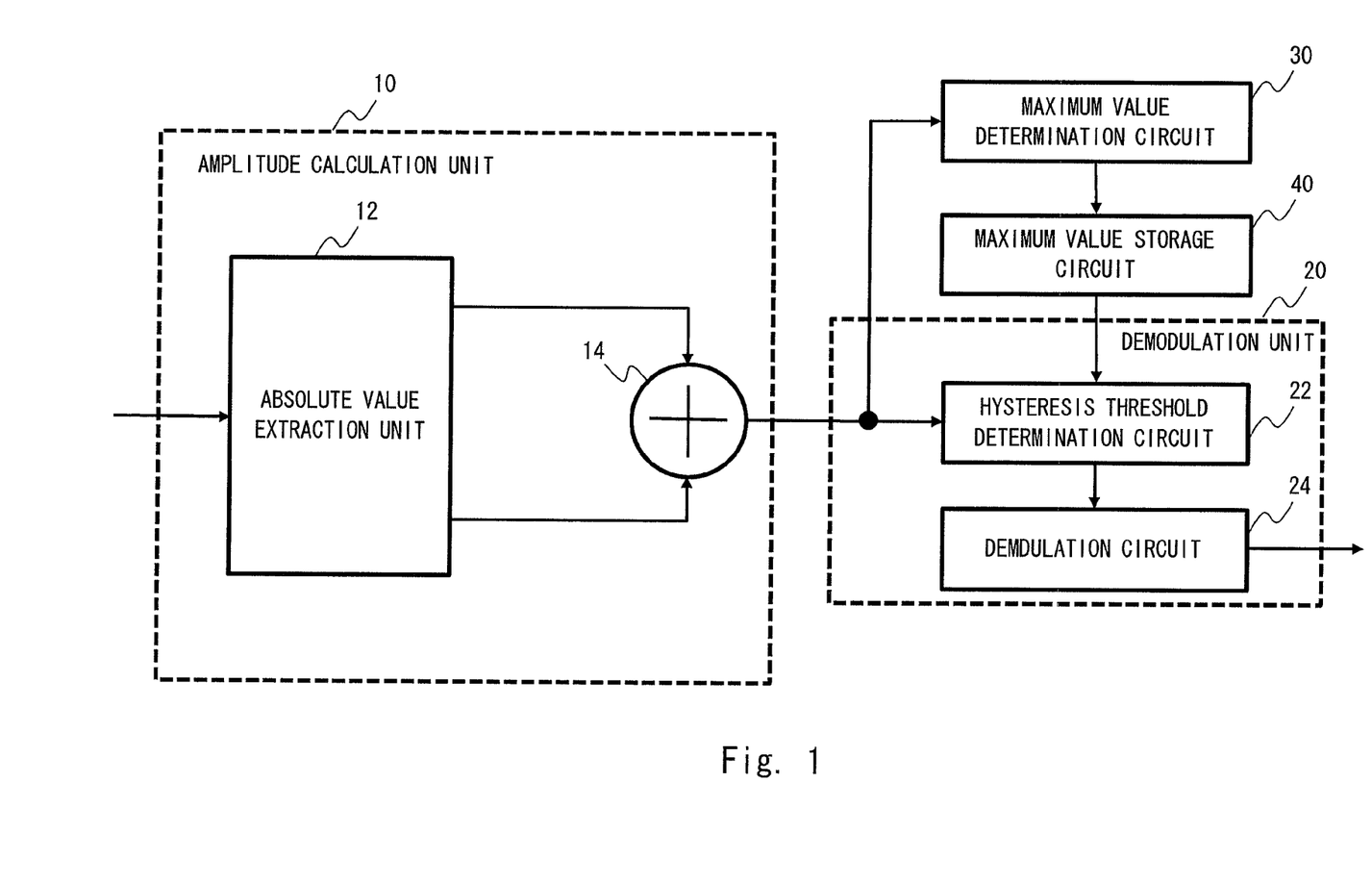
FIG. 1 is a configuration diagram of a demodulator in accordance with a first exemplary embodiment of the present invention.

The absolute value extraction unit 12 receives z=x+yi as the received symbol shown by the complex plane. The absolute value extraction unit 12 calculates the absolute value |Re|=|x| of real part in the complex number z and the absolute value |Im|=|y| of imaginary part in the complex number z. Further, the absolute value extraction unit 12 outputs the calculated absolute value |Re| of real part and the absolute value |Im| of imaginary part to the adding unit 14.

The adding unit 14 adds the absolute values |x| and |y| received from the absolute value extraction unit 12. The absolute value |x| is the absolute value |Re| of real part in the complex number z. The absolute value |y| is the absolute value |Im| of imaginary part in the complex number z. The adding unit 14 outputs the value obtained by adding |x| and |y| as a received symbol amplitude value to the hysteresis threshold determination circuit 22 and the maximum value determination circuit 30.

The maximum value determination circuit 30 determines the received symbol amplitude value showing the maximum value in the received symbol amplitude value output from the adding unit 14. For example, as a method to determine the maximum received symbol amplitude value, there is a method to determine the received symbol amplitude value showing the maximum value in the received symbol amplitude value received from the adding unit 14 during a period of time.

The maximum value storage circuit 40 stores the received symbol amplitude value determined in the maximum value determination circuit 30 as the received symbol amplitude value showing the maximum value. The maximum value storage circuit 40 outputs the maximum received symbol amplitude value to the hysteresis threshold determination circuit 22.

The hysteresis threshold determination circuit 22 sets the threshold to demodulate the received symbol based on the maximum received symbol amplitude value received from the maximum value storage circuit 40. A method of setting the threshold will be described later in detail. The hysteresis threshold determination circuit 22 compares the set threshold and the received symbol amplitude value received from the adding circuit 14. The hysteresis threshold determination circuit 22 outputs the compared result to the demodulation circuit 24.

When the demodulation circuit 24 receives the compared result indicating that the received symbol amplitude value is larger than the threshold from the hysteresis threshold determination circuit 22, for example, the demodulation circuit 24 outputs a demodulation signal "1". Further, when the demodulation circuit 24 receives the compared result indicating that the received symbol amplitude value is smaller than the threshold, for example, the demodulation circuit 24 outputs a demodulation signal "0".

Subsequently, the operation of the demodulator in accordance with the first exemplary aspect of the present invention is explained with reference to FIG. 2. The absolute value extraction unit 12 receives the complex number z=x+yi. The complex signal is shown by a polar form that x is A(t)cos θ and y is A(t)sin θ. The symbol A(t) shows the amplitude of carrier wave when the ASK modulation is executed. The symbol "t" shows a time. The symbol "θ" shows a phase. One output of the absolute value extraction unit 12 outputs the absolute value |Re|=|x|=|A(t)cos θ of real part in the complex number z. Another output of the absolute value extraction unit 12 outputs the absolute value |Im|=|y|=|A(t)sin θ| of imaginary part in the complex number z. The adding unit 14 adds the absolute value |Re| of real part in the complex number z and the absolute value |Im| of imaginary part in the complex number z. The adding unit 14 outputs |A(t)cos θ|+|A(t)sin θ| to the maximum value determination circuit 30 and the hysteresis threshold determination circuit 22. The value of |A(t) cos θ|+|A(t)sin θ| output from the adding unit 14 is the received symbol amplitude value X. The received symbol amplitude value X is shown by the following expression (6).

$$X = |A(t)\sin\theta| + |A(t)\cos\theta| \quad (6)$$
$$= \sqrt{(|A(t)\sin\theta| + |A(t)\cos\theta|)^2}$$
$$= A(t)\sqrt{1 + 2|\sin\theta||\cos\theta|}$$
$$= A(t)\sqrt{1 + |\sin(2\theta)|}$$

From the expression (6), the minimum value of the received symbol amplitude value X in the adding unit 14 is shown by the expression (7) when $\sin(2\theta)=0$ is satisfied.

$$X = A(t), \left(\theta = n \times \frac{\pi}{2}\right) \quad (7)$$

Further, the maximum value of the received symbol amplitude value X in the adding unit 14 is shown by the expression (8) when $\sin(2\theta)=\pm 1$ is satisfied.

$$X = \sqrt{2}\,A(t), \left(\theta = n \times \frac{\pi}{4}\right) \quad (8)$$

According to the expressions (7) and (8), the received symbol amplitude value X in the adding unit 14 changes in a range of satisfying the expression (9).

$$A(t) \leq X \leq \sqrt{2}A(t) \quad (9)$$

Figure 2:
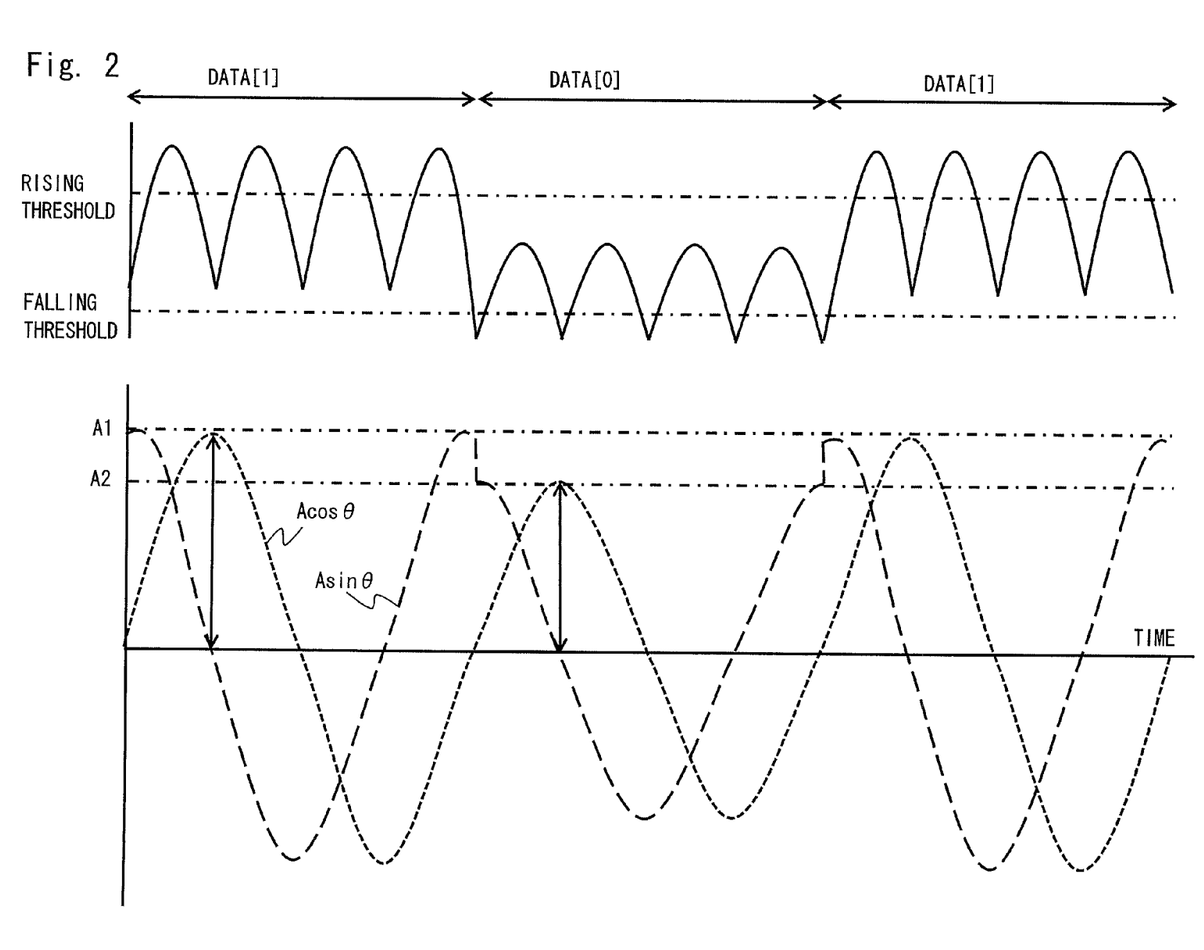
FIG. 2 illustrates a relationship with a received symbol amplitude value and a threshold in accordance with a first exemplary embodiment of the present invention.
Figure 3:
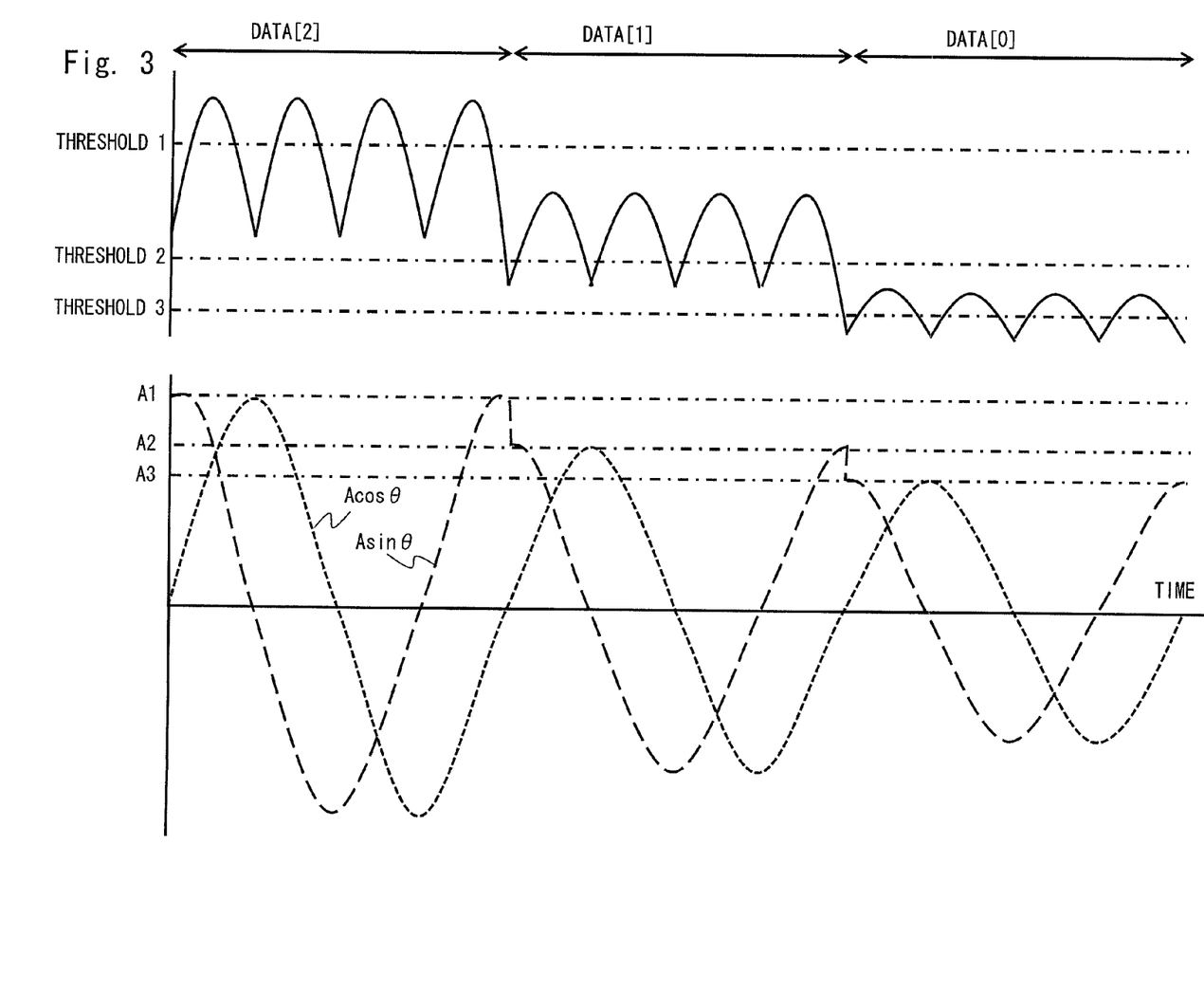
FIG. 3 illustrates a relationship with a received symbol amplitude value and a threshold in accordance with a first exemplary embodiment of the present invention.

The lower graph of FIG. 2 shows an example of the ASK modulation having two values. The vertical axis shows the amplitude value, and the horizontal axis shows the time. Further, the lower graph of FIG. 2 shows a graph of $A(t)\cos\theta$ as real part x in the complex value and shows a graph of $A(t)\sin\theta$ as imaginary part y in the complex value. The amplitude A(t) of carrier wave shows the state that the received data becomes the amplitude A1 when the data is "1" and the amplitude A2 when the data is "0". In this case, it is assumed that the relation of A1>A2 is satisfied and the ratio of the amplitude A1 to the amplitude A2 is determined by the ASK modulation degree set at the communication. The upper graph of FIG. 2 shows the value of $|A(t)\cos\theta|+|A(t)\sin\theta|$, in other words the received symbol amplitude value.

The received symbol amplitude value output from the adding unit 14 satisfies the following expression (10) or (11). FIG. 2 shows the graph satisfying the expression (11).

$$\sqrt{2}A1 > A1 > \sqrt{2}A2 > A2 \quad (10)$$

$$\sqrt{2}A1 > \sqrt{2}A2 > A1 > A2 \quad (11)$$

The maximum value determination circuit 30 determines the maximum value of the received symbol amplitude value as $\sqrt{2}A1$ from the expressions (10) and (11). The maximum value storage circuit 40 stores the value that the maximum value storage circuit 40 determines as the maximum value. The hysteresis threshold determination circuit 22 sets the threshold by the following method for demodulating the received symbol. When the data of two values is treated, the hysteresis threshold determination circuit 22 sets two thresholds. The hysteresis threshold determination circuit 22 sets the two thresholds as a rising threshold and a falling threshold in a range of satisfying the expressions (12) and (13).

$$\sqrt{2}A1 > \text{rising threshold} > \sqrt{2}A2 \quad (12)$$

$$A1 > \text{falling threshold} > A2 \quad (13)$$

The hysteresis threshold determination circuit 22 outputs the result of comparing the received symbol amplitude value output from the adding unit 14 with the rising threshold or the falling threshold to the demodulation circuit 24. When the received symbol amplitude value output from the adding unit 14 is over the rising threshold, in other words the maximum received symbol amplitude value is larger than the rising threshold, the demodulation circuit 24 demodulates data "1" and when the received symbol amplitude value output from the adding unit 14 is not over the rising threshold, in other words the maximum received symbol amplitude value is smaller than the rising threshold, the demodulation circuit 24 demodulates data "0" (method 1). Alternatively, when the received symbol amplitude value output from the adding unit 14 is below the falling threshold, in other words the minimum received symbol amplitude value is smaller than the falling threshold, the demodulation circuit 24 may demodulate data "0" and when the received symbol amplitude value output from the adding unit 14 is not below the falling threshold, in other words the minimum received symbol amplitude value is larger than the falling threshold, the demodulation circuit 24 may demodulate data "1" (method 2). Further, when the received symbol amplitude value output from the adding unit 14 is over the rising threshold, the demodulation circuit 24 may demodulate data "1" and when the received symbol amplitude value output from the adding unit 14 is below the falling threshold, the demodulation circuit 24 may demodulate data "0" (method 3).

The rising threshold and the falling threshold are shown as the expressions (14) and (15), respectively, using the ratio N(N=A2/A1) of the amplitude A1 to the amplitude A2.

$$\sqrt{2}A1 > \text{rising threshold} > \sqrt{2}A1 \times N \quad (14)$$

$$A1 > \text{falling threshold} > A1 \times N \quad (15)$$

Further, $\sqrt{2}A1$ is the value stored in the maximum storage circuit 40. Therefore, when $B=\sqrt{2}A1$ is satisfied, the expressions (14) and (15) are replaced with the expressions (16) and (17), respectively.

$$B > \text{rising threshold} > B \times N \quad (16)$$

$$\frac{B}{\sqrt{2}} > \text{falling threshold} > \frac{B}{\sqrt{2}} \times N \quad (17)$$

The value of $1/\sqrt{2}$ is stored by a register so that $1/\sqrt{2}$ in the expression (17) is the constant. Therefore, the operation circuit for calculating $1/\sqrt{2}$ is not needed.

Further, when the value of B in the maximum value storage circuit 40 is the fixed point of N bits, the value of $B/\sqrt{2}$ may be calculated by a multiplier having the constant $1/\sqrt{2}$ according to the bit width.

The operation using the above method 3 as setting method of the threshold is explained with reference to the upper graph of FIG. 2. For the period of data "1", the rising signal of the received symbol amplitude value output from the adding unit 14 is over the rising threshold, so that the demodulator 24 outputs data "1". Further, for the period of data "1", the falling signal of the received symbol amplitude value is not below the falling threshold, so that the output of the demodulator 24 maintains the output of the data "1". When a distortion occurs on the received symbol and the rising signal is not over the rising threshold for the period of data "1", the demodulator 24 maintains the output of the data "1" if the falling signal is not below the falling threshold.

When the data changes from "1" to "0", the demodulator 24 outputs the data "0" if the minimum value of the received symbol amplitude value becomes equal to or less than the falling threshold. Since then, for the period of data "0", the rising signal of the received symbol amplitude value is not over the rising threshold, in other words the maximum value of the received symbol amplitude value is not equal to or more than the rising threshold, so that the demodulator 24 maintains the output of data "0".

When the data changes from "0" to "1", the demodulator 24 outputs the data "1" if the rising signal of the received symbol amplitude value is over the rising threshold. Since then, for the period of data "1", the falling signal of the received symbol amplitude value is not equal to or less than the falling threshold, so that the demodulator 24 maintains the output of the data "1".

Next, the operation will be explained in detail when the amplitude of carrier wave by ASK modulation is 2 for the period of data "1", the amplitude of carrier wave by ASK modulation is 1.5 for the period of data "0", and the data of the received symbol amplitude value is shown by the signal of binary number of 8 bits without the code and 5 bits of fixed-point part.

The absolute value extraction unit 12 outputs the absolute value $|Re|=|x|=|2\cos\theta|$ of real part in the complex value z and the absolute value $|Im|=|y|=|2\sin\theta|$ of imaginary part in the complex number z for the period of data "1". The adding unit 14 outputs $X=|2\cos\theta|+|2\sin\theta|$ as the received symbol amplitude value. In this case, the maximum value determination circuit 30 selects $2\sqrt{2}$ as the maximum received symbol amplitude value and outputs this value to the maximum value storage circuit 40. The maximum storage circuit 40 stores the value of $2\sqrt{2}$ since the maximum received symbol amplitude value is $1.5\sqrt{2}$ for the period of data "0". In this case, the threshold is set to the value that satisfies the expression (16) and the expression (17). The received symbol amplitude value is shown by the signal of binary number of 8 bits without the code and 5 bits of fixed-point part. Accordingly, for the period of data "1", the received symbol amplitude value is between "01000000" and "01011011", and for the period of data "0", the received symbol amplitude value is between "00110000" and "01000100". The maximum value storage circuit 40 stores "01011011". The hysteresis threshold determination circuit 22 sets the rising threshold to "01011010" obtained by subtracting one from the value stored by the maximum storage circuit for satisfying the condition of the expression (16). The hysteresis threshold determination circuit 22 sets the falling threshold to "00111111" obtained by subtracting one from the value obtained by multiplying the value stored by the maximum storage circuit 40 by $1/\sqrt{2}$ for satisfying the condition of the expression (17). Accordingly, when the rising signal of the received symbol amplitude value is over "01011010", data "1" is output. When the falling signal of the received symbol amplitude value is below "00111111", data "0" is output.

As described so far, the demodulator according to the first exemplary embodiment of the present invention enables to decrease the calculation amount because the demodulator does not need to perform a square operation. Therefore, the circuit scale of the demodulator can be reduced. Further, the demodulator can further decrease the calculation amount by storing the value of $1/\sqrt{2}$ used to set the maximum value of the received symbol amplitude value and the threshold in advance. Further, the demodulator can demodulate the data of low demodulation degree by setting a plurality of thresholds like method 3. Therefore, the demodulator can improve the demodulation precision.

[Second Exemplary Embodiment]

Subsequently, a demodulator demodulating three values is explained. The constitution of the demodulator is similar to that shown in FIG. 1. When the demodulator performs the method 3, the hysteresis threshold determination circuit 22 according to the first exemplary embodiment of the present invention sets two thresholds. However, when the demodulator performs the method 3, the hysteresis threshold determination circuit 22 according to the second exemplary embodiment of the present invention sets three thresholds. In the following, the setting value of 3 thresholds is explained.

The signal of three values changes as follows. When the data is "2", the amplitude A(t) of carrier wave in ASK demodulation is the amplitude A1. When the data is "1", the amplitude A(t) of carrier wave in ASK demodulation is the amplitude A2. When the data is "0", the amplitude A(t) of carrier wave in ASK demodulation is the amplitude A3. The amplitude A1, A2, and A3 satisfies the relation of A1>A2>A3. The ratio of the amplitude A1 and A2 is N12. The ratio of the amplitude A1 and A3 is N13.

The hysteresis threshold determination circuit 22 sets threshold 1, threshold 2, and threshold 3 to the expression (18), the expression (19), and the expression (20). The value of B is $\sqrt{2}A1$ that the maximum value storage circuit 40 stores, as is similar to the first exemplary embodiment.

When the data is "2", the following expression (18) is satisfied;

$$\sqrt{2}\,A1 > \text{threshold 1} > \sqrt{2}\,A2 \qquad (18)$$
$$B > \text{threshold 1} > B \times N12$$

When the data is "1", the following expression (19) is satisfied;

$$\sqrt{2}\,A2 > \text{threshold 2} > \sqrt{2}\,A3 \text{ and } A1 > \text{threshold 2} > A2 \qquad (19)$$
$$B \times N12 > \text{threshold 2} >$$
$$B \times N13 \text{ and } \frac{B}{\sqrt{2}} > \text{threshold 2} > \frac{B}{\sqrt{2}} \times N12$$

When the data is "0", the following expression (20) is satisfied;

$$A2 > \text{threshold 3} > A3 \qquad (20)$$
$$\frac{B}{\sqrt{2}} \times N12 > \text{threshold 3} > \frac{B}{\sqrt{2}} \times N13$$

In this way, the data of 3 values can be demodulated by setting 3 thresholds like the first exemplary embodiment of the present invention.

The present invention is not limited to the above exemplary embodiments, but may be modified within the scope and the spirit of the present invention. For example, the demodulation signals having four or more values can be demodulated similarly to the above method.

While the invention has been described in terms of several exemplary embodiments, those skilled in the art will recognize that the invention can be practiced with various modifications within the spirit and scope of the appended claims and the invention is not limited to the examples described above.

Further, the scope of the claims is not limited by the exemplary embodiments described above.

Furthermore, it is noted that, Applicant's intent is to encompass equivalents of all claim elements, even if amended later during prosecution.

What is claimed is:

1. A demodulator that demodulates a plurality of received symbols having different amplitude in a carrier wave, the demodulator comprising:
    an amplitude value calculation unit that calculates a received symbol amplitude value by adding an absolute value of an in-phase component and an absolute value of quadrature component determined from an amplitude of the carrier wave in the received symbol; and
    a demodulation unit that detects a change of the received symbol amplitude value calculated by the amplitude value calculation unit, and demodulates the received symbol based on the detection result,
    wherein the demodulation unit sets a first threshold between a maximum received symbol amplitude value of a first received symbol output from the amplitude value calculation unit and a maximum received symbol amplitude value of a second received symbol smaller than the maximum received symbol amplitude value of the first received symbol, sets a second threshold between a minimum received symbol amplitude value of the first received symbol and a minimum received symbol amplitude of the second received symbol smaller than the minimum received symbol amplitude value of the first received symbol, and demodulates the received symbol based on a comparison result of the received symbol amplitude value output from the amplitude value calculation unit with the first and the second thresholds.

2. The demodulator of claim 1, wherein the amplitude value calculation unit calculates the received symbol amplitude value by adding the absolute value of the in-phase component and the absolute value of the quadrature component without performing a square operation.

3. The demodulator according to claim 1, wherein the demodulation unit outputs a first demodulation signal when a maximum value of the received symbol amplitude value output from the amplitude value calculation unit is bigger than the first threshold and a minimum value of the received symbol amplitude value is bigger than the second threshold, and outputs a second demodulation signal when the maximum value of the received symbol amplitude value output from the amplitude value calculation unit is smaller than the first threshold and the minimum value of the received symbol amplitude is smaller than the second threshold.

4. The demodulator according to claim 3, wherein the demodulation unit outputs the first demodulation signal, and maintains output of the first demodulation signal when the minimum value of the received symbol amplitude continues to be detected as greater than the second threshold.

5. The demodulator according to claim 3, wherein the demodulation unit outputs the second demodulation signal, and maintains output of the second demodulation signal when the maximum value of the received symbol amplitude continues to be detected as lower than the first threshold.

6. The demodulator according to claim 1, wherein the maximum received symbol amplitude value and the minimum received symbol amplitude value of the second received symbol are determined based on a ratio of a first carrier wave of the first received symbol to a second carrier wave of the second received symbol.

7. The demodulator according to claim 6, wherein the maximum received symbol amplitude value and the minimum received symbol amplitude value of the second received symbol are obtained by multiplying the maximum received symbol amplitude value and the minimum received symbol amplitude value of the first received symbol by the ratio of the first and the second carrier waves.

8. The demodulator according to claim 1, further comprising a maximum received symbol amplitude value storage unit that stores the maximum received symbol amplitude value of the first received symbol,
    wherein the demodulation unit sets a maximum value of the second received symbol, a minimum value of the second received symbol, and a minimum value of the first received symbol is association with the maximum received symbol amplitude value of the first received symbol.

9. The demodulator according to claim 1, wherein when the demodulation unit further receives from the amplitude value calculation unit a received symbol amplitude value of a third received symbol in which a maximum received symbol amplitude value is smaller than a maximum received symbol amplitude value of a second received symbol and a minimum received symbol amplitude value is smaller than a minimum received symbol amplitude value of the second received symbol,
    the demodulation unit sets a first threshold between a maximum received symbol amplitude value of a first received symbol and the maximum received symbol amplitude value of the second received symbol smaller than the maximum received symbol amplitude value of the first received symbol,
    the demodulation unit sets a second threshold between a minimum received symbol amplitude value of the first received symbol and a minimum received symbol amplitude value of the second received symbol smaller than the minimum received symbol amplitude value of the first received symbol, and between the maximum received symbol amplitude value of the second received symbol and the third received symbol amplitude value, and
    the demodulation unit sets a third threshold between the minimum received symbol amplitude value of the second received symbol and a minimum received symbol amplitude value of the third received symbol.

10. A demodulation method comprising:
    acquiring a plurality of received symbols having different amplitudes in a carrier wave;
    calculating a received symbol amplitude value by adding an absolute value of an in-phase component and an absolute value of quadrature component determined from an amplitude of the carrier wave in the received symbol;
    setting a first threshold and a second threshold according to a value of a demodulation signal that is output, the first threshold being set between a maximum received symbol amplitude value of a first received symbol and a maximum received symbol amplitude value of a second received symbol smaller than the maximum received symbol amplitude value of the first received symbol and the second threshold being set between a minimum received symbol amplitude value of the first received symbol and a minimum received symbol amplitude of the second received symbol smaller than the minimum received symbol amplitude value of the first received symbol;
    detecting a change of the received symbol amplitude value using the different threshold; and demodulating the received symbol based on a comparison result of the received symbol amplitude value with the first and the second thresholds.

11. The demodulation method of claim 10, wherein the calculating the received symbol amplitude value further comprises calculating the received symbol amplitude value by adding the absolute value of the in-phase component and the absolute value of the quadrature component without performing a square operation.

* * * * *

UNITED STATES PATENT AND TRADEMARK OFFICE
CERTIFICATE OF CORRECTION

PATENT NO. : 8,294,513 B2
APPLICATION NO. : 12/892511
DATED : October 23, 2012
INVENTOR(S) : Mitsuji Okada and Hiromi Saitou Page 1 of 1

It is certified that error appears in the above-identified patent and that said Letters Patent is hereby corrected as shown below:

In the Specifications

Column 4, Line 21: Delete "$\Delta A = X\cos\theta + Y\sin\theta - \{X\sin(\theta + \Delta\theta) + Y\cos(\theta + \Delta\theta)\}$" and insert -- $\Delta A = X\sin\theta + Y\cos\theta - \{X\sin(\theta + \Delta\theta) + Y\cos(\theta + \Delta\theta)\}$ --

Column 6, Line 56: Delete "$|Re| = |x| = |A(t)\cos\theta$" and insert -- $|Re| = |x| = |A(t)\cos\theta|$ --

Column 7, Line 29: Delete "$A(t) \leq X \leq \sqrt{\sqrt{2}}A(t)$" and insert -- $A(t) \leq X \leq \sqrt{2}A(t)$ --

Column 9, Line 46: Delete "circuit" and insert -- circuit 40 --

Signed and Sealed this
Thirteenth Day of May, 2014

Michelle K. Lee
*Deputy Director of the United States Patent and Trademark Office*